United States Patent
Calendron et al.

(10) Patent No.: US 9,244,332 B1
(45) Date of Patent: Jan. 26, 2016

(54) PULSE LIGHT SOURCE DEVICE AND METHOD FOR CREATING FS PULSES

(71) Applicant: Deutsches Elektronen-Synchrotron DESY, Hamburg (DE)

(72) Inventors: Anne-Laure Calendron, Hamburg (DE); Huseyin Cankaya, Hamburg (DE); Giulio Rossi, Hamburg, DE (US); Giovanni Cirmi, Hamburg (DE); Oliver D. Muecke, Hamburg (DE); Shaobo Fang, Hamburg (DE); Franz X. Kaertner, Hamburg (DE)

(73) Assignee: Deutsches Elektronen-Synchrotron DESY, Hamburg (DE)

( * ) Notice: Subject to any disclaimer, the term of this patent is extended or adjusted under 35 U.S.C. 154(b) by 0 days.

(21) Appl. No.: 14/578,684

(22) Filed: Dec. 22, 2014

(51) Int. Cl.
*H01S 3/16* (2006.01)
*G02F 1/39* (2006.01)
*H01S 3/06* (2006.01)
*H01S 3/00* (2006.01)

(52) U.S. Cl.
CPC ............. *G02F 1/39* (2013.01); *H01S 3/0085* (2013.01); *H01S 3/0604* (2013.01); *H01S 3/0606* (2013.01); *H01S 3/1618* (2013.01); *G02F 2001/392* (2013.01)

(58) Field of Classification Search
CPC ... H01S 3/005; H01S 3/10007; H01S 3/2308; H01S 3/1618; G02F 2001/392; G02F 1/39
See application file for complete search history.

(56) References Cited

U.S. PATENT DOCUMENTS

| 2005/0226278 A1* | 10/2005 | Gu .................. H01S 3/0057 372/6 |
|---|---|---|
| 2010/0061411 A1 | 3/2010 | Chang et al. |
| 2014/0139921 A1 | 5/2014 | Tournois et al. |

FOREIGN PATENT DOCUMENTS

| CN | 201054063 Y | 4/2008 |
|---|---|---|
| CN | 101320191 A | 12/2008 |
| CN | 201252335 Y | 6/2009 |
| CN | 101764341 A | 6/2010 |
| WO | 2007149956 A2 | 12/2007 |
| WO | 2011157284 A1 | 12/2011 |

OTHER PUBLICATIONS

Deng et al. "Carrier-envelope-phase-stable, 1.2 mJ, 1.5 cycle laser pulses at 2.1 μm", Optics Letters, vol. 37, No. 23, pp. 4973-4975 (2012).*

(Continued)

*Primary Examiner* — Eric Bolda
(74) *Attorney, Agent, or Firm* — Caesar Rivise, PC

(57) ABSTRACT

A pulse light source device for creating fs output pulses, includes a driver source device including a ps laser pulse source for creating a ps laser pulse output, a first beam splitting device for splitting the ps laser pulse output to first and second ps driver pulses, a first spectral broadening device for creating first fs driver pulses by spectrally broadening the first ps driver pulses, an optical parametric amplifier (OPA) device for creating CEP stabilized second fs driver pulses, and for seeding on the basis of the first fs driver pulses and pumping with the second ps driver pulses, wherein the second fs driver pulses include idler pulses of the OPA device, and a second spectral broadening device for creating the fs output pulses, and arranged to be driven on the basis of the second fs driver pulses. Furthermore, a method of creating fs output pulses is described.

20 Claims, 2 Drawing Sheets

(56) References Cited

OTHER PUBLICATIONS

Bradler, "Bulk Continuum Generation: The Ultimate Tool for Laser Applications and Spectroscopy", Ph.D. Dissertation, Jul. 2014.
Calendron et al., "1kHz, multi-mJ Yb: KYW bulk regenerative amplifier", Poster JW2A.16 for conference Hilas/QIM, Berlin, Germany, Mar. 18-20, 2014.
Calendron, "Dual-crystal Yb: CALGO high power laser and regenerative amplifier", Optics Express, vol. 21, No. 22, 26174-26181 (2013).
Calendron et al., "High-energy kHz Yv:KYW dual-crystal regenerative amplifier", Optics Express, vol. 22, No. 20, 24752-24762 (2014).
Calendron et al., "Optimized temperature/bandwidth operation of cryogenic Yb:YAG composite thin-disk laser amplifier", Poster JW2A.10 for conference Hilas/QIM, Berlin, Germany, Mar. 18-20, 2014.
Calendron et al., "An Orchestra of Light", IMPRS Workshop, Dresden, Germany, May 16, 2013.
Cankaya et al., "Passively CEP-stable front end for optical frequency synthesis", Poster 07, International Conference on Ultrafast Phenomena, Okinawa, Japan, Jul. 7-11, 2014.
Cirmi et al., "Carrier-envelope phase stable, few-optical-cycle pulses tunable from visible to near IR", J. Opt. Soc. Am. B, vol. 25, No. 7, pp. B62-B69 (2008).
Fang et al., "Multi-mJ Parametric Synthesizer Generating Two-Octave-Wide Optical Waveforms", Invited Talk WB3-1, CLEO Pacific Rim, Kyo-to, Japan, Jun. 30-Jul. 4, 2013.
Fattahi et al., "Third-generation femtosecond technology", Optica, vol. 1, pp. 45-63 (2014).
Harth et al., "Two-color pumped OPCPA system emitting spectra spanning 1.5 octaves from VIS to NIR", Optics Express, vol. 20, No. 3, 6 pages (2012).
Huang et al., "High-energy pulse synthesis with sub-cycle waveform control for strong-field physics", Nature Photonics, vol. 5, pp. 475-479 (2011).
Muecke et al., "Millijoule-Level Parametric Synthesizer Generating Two-Octave-Wide Optical Waveforms for Strong-Field Experiments", Presentation in CLEO 2013 Conference, San Jose, CA.
Muecke et al., "Scalable Yb-MOPA-driven carrier-envelope phase stable few-cycle parametric amplifier at 1.5 µm", Optics Letters, vol. 34, No. 2, pp. 118-120 (2009).
Rossi et al., "Spectro-Temporal Characterization of All Channels in a Sub-Optical-Cycle Parametric Waveform Synthesizer", Presentation in CLEO 2014 Conference, San Jose, CA.
English-language abstract of CN201054063 (2008).
English-language abstract of CN101320191 (2008).
English-language abstract of CN201252335 (2009).
English-language abstract of CN101764341 (2010).

\* cited by examiner

PULSE LIGHT SOURCE DEVICE AND METHOD FOR CREATING FS PULSES

FIELD OF THE INVENTION

The present invention relates to a pulse light source device, being adapted for creating fs (femtoseconds) output pulses, in particular to a broadband CEP-stable pulsed light source, and to a method for creating fs output pulses. Applications of the invention are available in the fields of seeding of pulse amplifiers, like OPAs or OPCPAs, generating of ultrashort, high energy pulses for scientific experiments, such as in attoseconds science, high harmonic generation, field-emission devices, seeding of optical waveform synthesizers, time-resolved spectroscopy, and micromachining.

BACKGROUND OF THE INVENTION

For describing the background of the invention, particular reference is made to the following publications:

[1] G. Cirmi et al. in "J. Opt. Soc. Am. B" vol. 25, no. 7, p. B62 (2008);
[2] G. M. Rossi et al. in CLEO 2014 conference, San Jose, USA, (Optical Society of America, Washington, D C, 2014), SF1E.3;
[3] S.-W. Huang et al in "Nature Photonics" vol. 5, p. 475 (2011);
[4] O. D. Mücke et al. in CLEO 2013 conference, San Jose, USA, (Optical Society of America, Washington, D C, 2013);
[5] A. Harth et al. in "Opt. Express" vol. 20, p. 3076 (2012);
[6] O. Mücke et al. in "Optics Letters" vol. 34, p. 118 (2009);
[7] Hanieh Fattahi et al. in "Optica" vol. 1, p. 45-63 (2014);
[8] US 2014/0139921 A1;
[9] WO 2011/157284 A1;
[10] CN 101764341;
[11] CN 201252335;
[12] CN 201054063;
[13] CN 101320191;
[14] WO 2007/149956 A2; and
[15] A.-L. Calendron in "Opt. Express" vol. 21, p. 26174 (2013).

In strong field physics, there is a need for high-energy light pulses with multi-octave bandwidth, e. g. for initiating events occurring within one optical cycle or for creating as (attoseconds) pulses. It is generally known that such high-energy pulses with multi-octave bandwidth cannot be generated by regular laser gain media, but by optical frequency synthesis techniques and nonlinear pulse broadening (e. g. [3]). Multiple amplifiers operated in different spectral regions and pulse shaping (e. g. [8]) are used for creating broadband spectra, wherein frequency synthesis is flexible in spectral shaping allowing tuning of the pulse shape (e. g. [7]). Because of a broad and tunable amplification bandwidth, optical parametric amplifiers (OPAs) or optical parametric chirped pulse amplifiers (OPCPAs) are typical used in frequency synthesizers. OPAs and OPCPAs require broadband seed pulses and high-energy pump pulses. Due to the direct electric field driven processes e. g. in high-harmonics generation or tip emission processes, carrier envelope phase (CEP) stability of the seed pulses is required. The front-end has thus to be CEP stable before the amplification with follow-on OPAs, typically at kHz repetition rates.

The main methods to achieve CEP stability are either active or passive CEP stabilization techniques. Actively CEP stabilized systems (e. g. [14]) are based on fast feedback loops controlling the intracavity pulse dynamics of a laser oscillator, which will be used as a seed pulse source for further amplification. These systems are very complex and subject to failure and instabilities. In addition, they would be sensitive to timing jitter of the pump lasers in follow on amplification stages.

In passively CEP stabilized systems (e. g. [1], [2], [4], [7], [9]-[13]), the same pulses are used to generate e. g. the CEP-stable seed-pulses for the signal channel and the seed-pulses for the pump pulse channel in OPAs and/or OPCPAs. For example, according to [9], a driver pump source with three outputs is used, the first and second one for generating CEP stable broadband pulses and the third one seeding the pump line for OPA or OPCPA based amplification. For obtaining a CEP-stable seed source, difference frequency generation was employed. The passive systems are more reliable because they do not rely on broadband oscillators and elaborate electronics and they are immune to timing jitter of the oscillator pulses.

A first group of conventional passively CEP stabilized systems is based on either Ti:Sapphire (e. g. [1], [2], or [4]) or fiber based pump technologies, which provide sub-500 fs pulses. Ti:Sapphire pump lasers have an inherent and fundamental limitation on average power due to the high heat load inside the crystals. Even if Ti:Sapphire pump technology sustains high-pulse energy, it is limited in average power because of the high quantum defect causing thermal problems. The current fiber technology provides high average power at the expense of pulse energy due to nonlinear effects inside the fiber gain medium. Due to the above limitations, the conventionally used pump sources have general disadvantages in terms of non-scalability of the achievable spectrum and pump energy.

Another group of conventional passively CEP stabilized systems uses Yb-based driver lasers (e. g. [6] or [7]). According to [6], a system is described, which relies on passive CEP stability, an Yb-based driver laser and white-light continuum generation (WLG) in bulk at 515 nm. The driver of the WLG process is the second harmonic of the Yb-based driver laser, resulting in disadvantages in terms of stability and complexity of the set-up. White-light generated at 515 nm is less stable and requires more complicated setup because of multi-photon absorption. The band-gap of suitable materials is typically 5-7 eV and third harmonic generation can contribute to the WLG process. Usually, for WLG at 515 nm, the material needs to be constantly moved or rotated for avoiding degradation and damage. This movement introduces further instabilities, which are incompatible with CEP stabilization. As a further disadvantage of [6], there is no multi-octave WLG from a CEP stable idler.

OBJECTIVE OF THE INVENTION

The objectives of the invention are to provide an improved pulse light source device and an improved method for creating fs output pulses, which are capable of avoiding limitations and disadvantages of conventional techniques, resp. The device and method are to be provided yielding in particular an extended spectral coverage, an increased pulse energy, an increased average power, a scalability of the fs output in terms of energy, average power and/or spectral coverage, an increased temporal and/or spectral stability, and/or a reduced complexity of the optical set-up.

SUMMARY OF THE INVENTION

The above objectives are solved by a pulse light source device and a method of creating fs output pulses comprising the features of the invention.

According to a first general aspect of the invention, a pulse light source device for creating fs output pulses comprises a driver source device, a first beam splitting device, a first spectral broadening device (first non-linear broadening stage), an optical parametric amplifier (OPA) device and a second spectral broadening device (second non-linear broadening stage). The driver source device includes a ps laser pulse source, which is adapted for creating a ps laser pulse output. The first beam splitting device is arranged for splitting the ps laser pulse output into two portions, in the following indicated as first and second ps driver pulses, resp. The first spectral broadening device is arranged for spectrally broadening the first ps driver pulses, resulting in a broadband fs output (in the following: first fs driver pulses), on the basis of which the OPA device is seeded. Furthermore, the driver source device is coupled via the first beam splitting device with the OPA device, which is arranged to be pumped with the second ps driver pulses. The OPA device is arranged for creating a signal output and a fs idler output (in the following: second fs driver pulses). Due to the same source of the second ps driver pulses and the first fs driver pulses, the second fs driver pulses have a stable CEP relationship. The second spectral broadening device is arranged for providing the fs output pulses to be obtained. To this end, the second spectral broadening device is arranged to be driven (pumped) on the basis of the second fs driver pulses.

According to a second general aspect of the invention, a method of creating fs output pulses comprises the following steps. First and second ps driver pulses are provided by splitting initial ps laser pulses. The first ps driver pulses are spectrally broadened, resulting in first fs driver pulses. Second fs driver pulses are created by seeding an OPA device on the basis of the first fs driver pulses and pumping the OPA device with the second ps driver pulses. The second fs driver pulses comprise the CEP stabilized idler pulses of the OPA device. The fs output pulses to be obtained are created by driving (pumping) a further spectral broadening process on the basis of the second fs driver pulses.

Advantageously, the pulse light source device is a power scalable CEP-stable pulse light source (parametric synthesizer). The invention provides passively CEP stabilized output pulses covering in particular multi-octave spanning bandwidth. The system is stable in long-term operation. The pulse energy and average power of the invention are scalable to higher values because of the ps laser pulse source used for driving the spectral broadening and OPA devices. Using the driving ps laser pulse source enables amplification to high energy at large average power. Furthermore, the use of ps pump pulses for driving the first spectral broadening device provides advantages for the subsequent spectral broadening. The white-light generation in gases or in the atmosphere has been demonstrated with 10 s ps to ns long pulses, though. However, the phase stability of such a continuum driven by long-driver pulses was not demonstrated before the invention. Particularly, the inventors have found a conservation of the phase during the broadening, which enables to generate CEP-stable white-light continuum.

As a further advantage of the invention, the ps laser pulse source is not limited to a certain set-up and/or geometry, but can employ an energy and power scalable laser source producing the ps laser pulse output. The ps laser pulse source is not limited by the pump pulse duration and is working for pulses even with sub-500 fs to several ps duration. The repetition rate is also freely variable, between a low repetition rate of e. g. 100 Hz to a high repetition rate of e. g. several MHz.

According to a preferred embodiment of the invention, the driver source device includes a regenerative amplifier providing the ps laser pulse source. The ps laser pulse output can be generated e. g. with a regenerative amplifier preferably having an output in the mJ range. Using the regenerative amplifier simplifies timing stabilization of seed and pump pulses in follow on OPAs or OPCPAs. The amplitude stability of the ps laser pulse output can be improved with a feedback-control stabilization of the driver source device.

The term "ps laser pulse output" refers to ps pulses or slightly sub-ps pulses. Preferably, the ps laser pulse source is arranged for creating the ps laser pulse output with a pulse duration of at least 300 fs, e. g. at least 500 fs, in particular at least 700 fs, and/or at most 5 ps, e. g. at most 2 ps, in particular at most 1 ps. Advantageously, the pulse duration is optimum for seeding an amplification stage, e. g. a cryo amplification chain that can be used as a pump in the OPAs or OPCPAs that amplify a white light seed obtained from the same pulses. The cryogenic amplification chain might be replaced with other narrow- to moderate-bandwidth amplifiers.

According to particularly preferred embodiment of the invention, the ps laser pulse output is created with an Yb-doped (Ytterbium-doped) solid state pulse laser, i. e. a laser having a Yb-doped laser gain medium, like e. g. an Yb-slab or Yb-based thin-disk laser.

The use of Yb-doped laser gain media has the following important advantage. The quantum defect for Yb-ions is much smaller than for Ti:Sapphire (~10% compared to ~50%), thus strongly reducing the heat load and the thermal constraints (scalability of the spot size in the gain media). The inventors have found that in particular these features support the scalability to high average power of the ps laser pulse output of driver source device and correspondingly the fs output pulses created with the inventive pulse light source device.

In Yb-based lasers, the pulse duration, achievable average power and energy depend on the host of the doping ions. The maximum average power is limited by the heat removal from the host, which depends on the thermo-mechanic and thermo-optic characteristics of the host (variation of the refractive index with temperature, thermal conductivity, coefficient of thermal expansion). A host like YAG has many advantages with respect to heat removal, hence enables good beam quality, but does not have an emission bandwidth sustaining pulses shorter than 700 fs. Other hosts comprise e. g. KYW, KGW, YLF, Glass, CALGO ($CaAlGdO_4$), or $YVO_4$.

According to a further preferred feature of the invention, the output of the driver source device is directly coupled with the first spectral broadening device. Accordingly, the first spectral broadening device is pumped by the ps laser pulse output as created by the ps laser pulse source. In particular, contrary to [6], this embodiment directly uses the output of the driver source device without any frequency shifting or doubling. That makes the inventive device simpler and much more robust than the conventional technique.

The OPA device generally comprises at least one of an OPA stage and an OPCPA stage. According to a preferred embodiment of the invention, the OPA device is a two stage device. In the following, the term OPA stage refers to a parametric amplifier, including an OPA stage or an OPCPA stage. A first OPA stage is provided including an optically non-linear crystal for parametric amplification, which is arranged for creating pre-amplified fs pulses. The first OPA stage is arranged to be seeded with the first fs driver pulses and pumped directly with a first portion of the second ps driver pulses. A second OPA stage is provided including another optically non-linear crystal for parametric amplification, which is arranged for creating the second fs driver pulses. The second OPA stage is arranged to be seeded with the pre-amplified fs pulses and directly pumped with a second portion of the second ps driver pulses. Thus, both OPA stages are directly driven by the e. g. Yb-based driver.

With this two stage embodiment, the final passively-CEP stable white-light continuum is not directly generated via single OPA, as done in [8], but rather via the second OPA stage producing a CEP-stable idler. This idler has higher energy stability with respect to a single OPA stage and it is producing sub-100 fs pulses that are finally used to generate in the second white-light generation stage, the actual broadband seed continuum for the signal channel of a broadband OPA/OPCPA amplifier chain or several parallel OPA/OPCPA amplifier chains that form an optical waveform synthesizer.

Furthermore, the two stage embodiment supports a highly stable CEP and it enables very broadband generation of continuum with a flat phase in the wavelength region of interest. The amplitude of the second fs driver pulses is stabilized as preferred for stable spectral broadening: amplitude modulation transfer in timing and CEP-jitter during the spectral broadening, as the precise start of the broadening process depends on the amplitude of the pulse. To achieve high amplitude stability, the first OPA stage preferably is not saturated, but provides e.g. 3 orders of magnitude amplification. The second OPA stage preferably operates saturated to achieve an amplitude stable pulse train of the second fs driver pulses.

Contrary to conventional techniques, e. g. [9], the invention uses the second spectral broadening on the basis of the idler of a highly amplitude stable two stage OPA instead of DFG. New spectral components are generated by pumping the second nonlinear spectral broadening stage using the CEP-stable idler beam, which enables to cover wider spectra.

According to an alternative embodiment of the invention, the OPA device comprises one OPA stage only, being combined with a pulse stretcher unit and a pulse compressor unit. The pulse stretcher unit is arranged for stretching the first fs driver pulses. The OPA stage creates amplified stretched pulses, wherein the OPA stage is seeded with the stretched first fs driver pulses and pumped with the second ps driver pulses. The pulse compressor unit is arranged for creating the second fs driver pulses by compressing the amplified stretched pulses output by the OPA stage. Advantageously, this embodiment reduces the number of OPA stages.

As a further advantage of the invention, multiple variants are available for designing the first and second spectral broadening devices, which can be provided separately or in combination. With preferred examples, at least one of the first and second spectral broadening devices includes a white light generation crystal or an optical fiber.

Preferably, the first fs driver pulses are created by the first spectral broadening device with a pulse duration of at least 20 fs, in particular at least 50 fs and/or at most 200 fs, at most 300 fs. Furthermore, the fs output pulses are created by the second spectral broadening device with a preferred pulse duration of at least 1 fs, in particular at least 50 fs and/or at most 300 fs, at most 500 fs.

According to a further preferred feature of the invention, the second spectral broadening device is arranged for creating the fs output pulses as a supercontinuum covering a frequency range of at least two octaves. The fs output pulses have a so-called white light spectrum that spans two, three or more octaves. The point of having the multi-octave supercontinuum is to have a continuum spectrum for the synthesis, giving a single or sub-cycle pulse. Advantageously, the different spectral regions of the spectrum can be split, parametrically amplified, and recombined again in a synthesizer, as described e. g. in [1] or [2].

Preferably, the second spectral broadening device is arranged for creating the fs output pulses with a center wavelength in a range of 0.4 μm to 10 μm. Advantageously, the generation of the broadband spectrum of the fs output pulses is realized at a different wavelength than in references [1], [2] or [4], which allows the continuum to extend further in the mid-infrared (MIR).

As a further advantage of the invention, additional nonlinear frequency conversion steps can be added to further extend and/or shape the spectrum of the fs output pulses. Thus, according to a further preferred embodiment of the invention, the pulse light source device may further comprise a second beam splitting device, which is arranged for splitting the second fs driver pulses into at least two broadening channels. Each of the broadening channels includes a spectral broadening unit. Each portion of the second fs driver pulses is subjected to the second spectral broadening in an associated spectral broadening unit. Advantageously, each of the spectral broadening units of the second spectral broadening device is arranged for creating fs output pulses with at least one of specific spectral coverage, specific pulse shape and specific phase. In particular, the spectral broadening units can be optimized to generate different spectral regions.

According to the invention, the second spectral broadening device is arranged to be pumped on the basis of the second fs driver pulses created by the OPA device. Pumping on the basis of the second fs driver pulses refers to directly coupling the second spectral broadening device with the OPA device idler output (optionally compressed), or alternatively providing a Second Harmonic Generation unit (SHG unit) between the OPA device idler output and the second spectral broadening device.

BRIEF DESCRIPTION OF THE DRAWINGS

Further details and advantages of the invention are described in the following with reference to the attached drawings, which show in.

DESCRIPTION OF THE PREFERRED EMBODIMENTS

Figure 6:
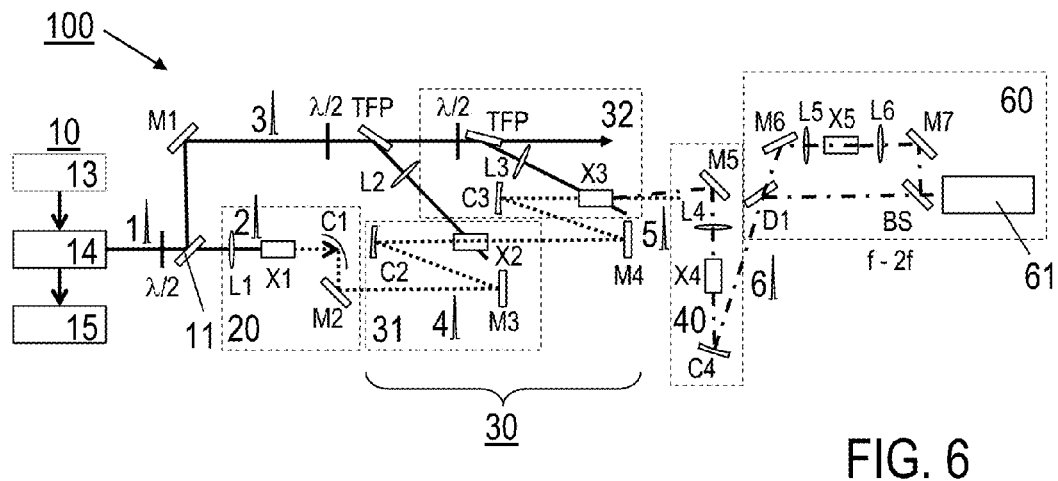
FIG. 6: a detailed illustration of the embodiment of FIG. 1.

Features of preferred embodiments of the invention are described in the following with particular reference to the combination of spectral broadening and amplifier devices. Details of these devices are not described as far as they are known from conventional light pulse generation, manipulation and amplification techniques. In particular, the spectral broadening and amplifier devices are schematically illustrated. With a practical implementation of the invention, these devices may include further optical components, like e.g.

mirrors, refractive optics, reflective optics, polarizers and/or sensors, e. g. as exemplified in FIG. 6.

The present invention provides a solution for the generation of CEP-stable, broadband pulses driven by slightly sub-ps pump pulses for seeding multi-octave spanning high-energy waveform synthesizers. The pulse light source device proposed by the invention can be used e.g. as a front-end for an Yb-based waveform synthesizer. The following description refers to an embodiment of the invention for this application in an exemplary manner. For other applications, the pulse light source device can be modified, in particular combined with further amplifier and/or waveform synthesizer components.

Figure 1:
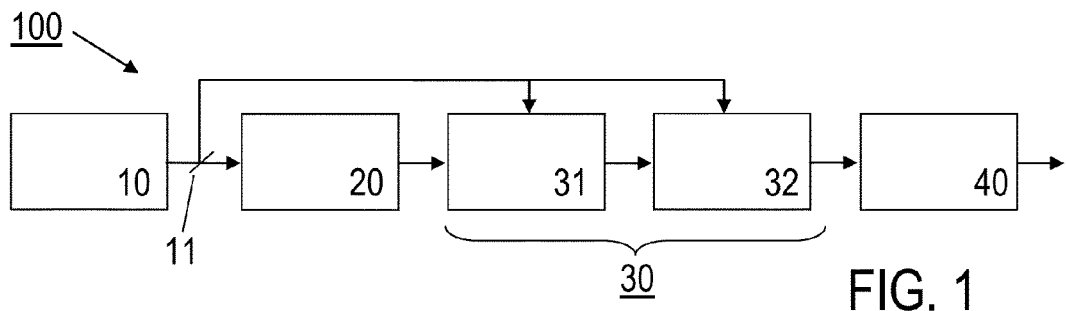
FIGS. 1 and 2: schematic representations of preferred embodiments of a pulse light source device according to the invention.

According to FIG. 1, a first embodiment of the inventive pulse light source device 100 comprises a driver source device 10, a first beam splitting device 11, a first spectral broadening device 20 to broaden the spectrum of the driver source device 10, an OPA device 30 with two OPA stages 31, 32, and a second spectral broadening device 40 to broaden the idler output spectrum of the second OPA stage 32. The driver source device 10 comprises a ps laser pulse source, scalable to high energies and high average power, creating a ps laser pulse output. The OPA device 30 fulfills two functions: reach a stable and high enough pulse energy necessary for the second broadening mechanism in the second spectral broadening device 40, and generate a CEP stable idler pulse. The second OPA stage 32 results in two outputs, a CEP stable idler output and a non-stable signal output. The second spectral broadening device 40 is driven by the CEP stable pulses and preserves the phase. Further details of the components 10 to 40 are described below with reference to FIG. 6.

Figure 2:
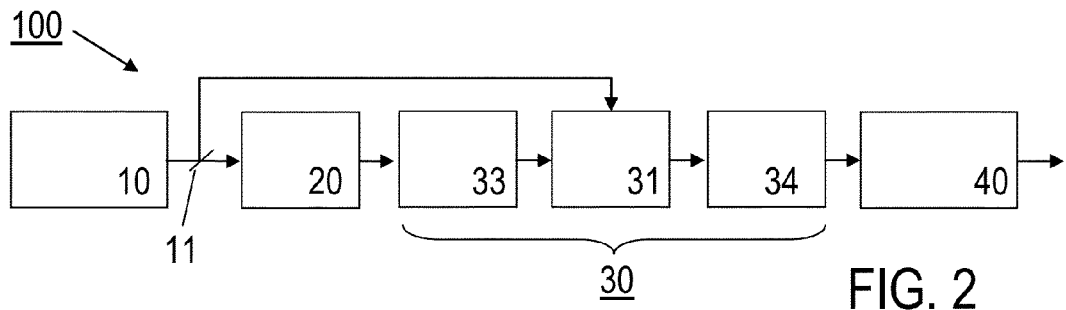

FIG. 2 shows a second embodiment of the pulse light source device 100 which is configured with the components 10, 20 and 40 like the pulse light source device 100 of FIG. 1. Deviating from the first embodiment, the OPA device 30 comprises one OPA stage 31 and additionally a pulse stretcher unit 33 and a pulse compressor unit 34. The parametric amplification by the OPA device 30 is made more efficient by stretching and compressing the first fs driver pulses output by the first spectral broadening device 20.

Thus, one OPA stage 31 is sufficient to reach the μJ level which is preferred for the second spectral broadening device 40. With the pulse stretcher unit 33, e. g. 50 fs long first fs driver pulses from the first spectral broadening device 20 can be stretched to several hundreds of fs (e. g. 400 to 500 fs to match the pulse duration of the ps laser pulse output).

Figure 3:
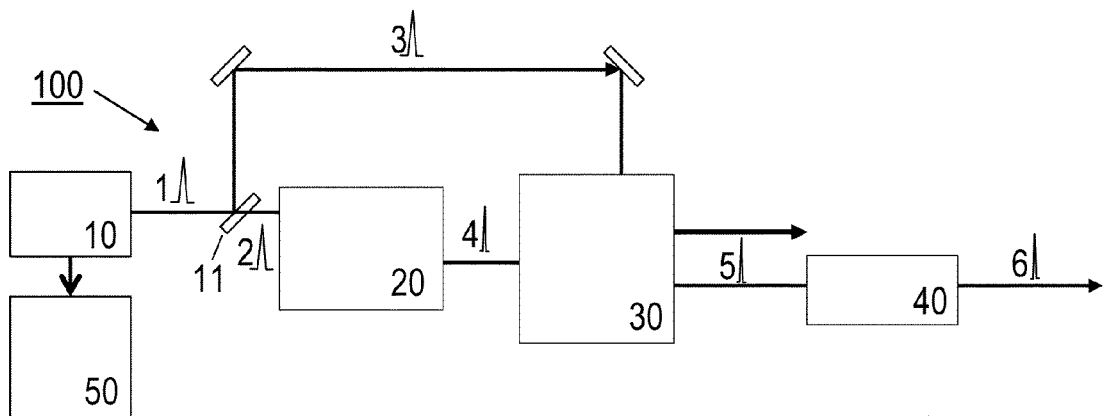
FIG. 3: a schematic representation of further features of a pulse light source device according to the invention.

The inventive method for creating fs output pulses is described with reference to FIG. 3, which schematically shows the pulse light source device 100 of FIG. 1 or 2, wherein the driver source device 10 is combined with a further amplification stage 50.

Preferably, the driver source device 10 comprises an Yb-ion-doped oscillator, followed by a stretcher unit and a regenerative amplifier (no shown in detail). The oscillator and the regenerative amplifier comprise e.g. Yb:KYW laser gain media (e.g. [5]) or CALGO laser gain media (e.g. [15]).

The output of the regenerative amplifier is divided into two parts. The first part is compressed to provide the ps laser pulse output 1, while the second part can be provided for further amplification with the amplification stage 50. The regenerative amplifier combined with a driver compressor provides the ps laser pulse source of the driver source device 10.

The driver source device 10 creates a ps-laser pulse output 1, comprising a pulse train with a pulse duration of 700 fs, a repetition rate of 1 kHz and a pulse energy of 6 mJ. The first beam splitting device 11 comprises a semi-transparent mirror, thin film polarization (TFP) beam splitter, or a combined variable beam splitter/attenuator for splitting the ps laser pulse output 1 to first ps driver pulses 2 and second ps driver pulses 3. The first ps driver pulses 2 are directly focused into the WLG crystal of the first spectral broadening device 20 (see FIG. 6). The first ps driver pulses 2 have enough energy to create new spectral components by the non-linear interaction in the WLG crystal. The second ps driver pulses 3 are reflected via flat or curved mirrors 12 to the OPA device 30.

A second output of the driver source device 10 is coupled with the amplification stage 50. The amplification stage 50 includes at least one light pulse amplifier with a laser gain medium, which is not limited in energy or power due to thermal effects. According to a preferred application of the invention, the fs output pulses 6 generated with the inventive pulse light source device 100 are used for seeding the amplification stage 50, so that the CEP-stable pulses can be further amplified with the amplification stage 50 (so-called "pump line").

The first spectral broadening device 20 is arranged for spectrally broadening the first ps driver pulses 2 by WLG in a bulk crystal. Alternatively, spectral broadening can be realized by other means, and it is not restricted to self-phase modulation and cross-phase modulation. For example, the WLG crystal can be replaced by an optical fiber. The output of the first spectral broadening device 20 comprises first fs driver pulses 4 with a pulse duration of e.g. 50 fs and a pulse energy of e.g. 10 nJ.

The amplification of the spectral components of the first fs driver pulses 4 with the OPA device 30 is realized with nearly degenerate optical parametric amplification, but can be extended to other OPA or OPCPA configurations. The output of the OPA device 30 comprises an idler wave indicated as second fs driver pulses 5, and a signal wave. As the second ps driver pulses 3 and the first fs driver pulses 4 are created by the same compressed pulses of the ps laser pulse output 1, the variable part of the CEP in the seed and pump pulses of the OPA device 30 cancels in the phase of the second fs driver pulses 5.

The bandwidth of the amplified signal is set such that a further spectral broadening process can be performed. With a practical example, the second fs driver pulses 5 comprise 620 fs transform limited pulses, which are provided for the second spectral broadening step. The second fs driver pulses 5 are directly focused into the WLG crystal of the second broadening device 40 (as shown in FIG. 1 to 4 or 6), or it can be subjected to a frequency doubling step before the second spectral broadening (see FIG. 5).

The WLG crystal of the second spectral broadening device 40 is pumped with the second fs driver pulses 5, resulting in a further spectral broadening. Accordingly, the output of the second spectral broadening device 40, provides the fs output pulses 6 with a pulse duration of e.g. 100 fs, a pulse energy of 10 nJ, an average power of 10 μW and a spectral coverage of two octaves with a center wavelength of 1.2 μm.

Figure 4:
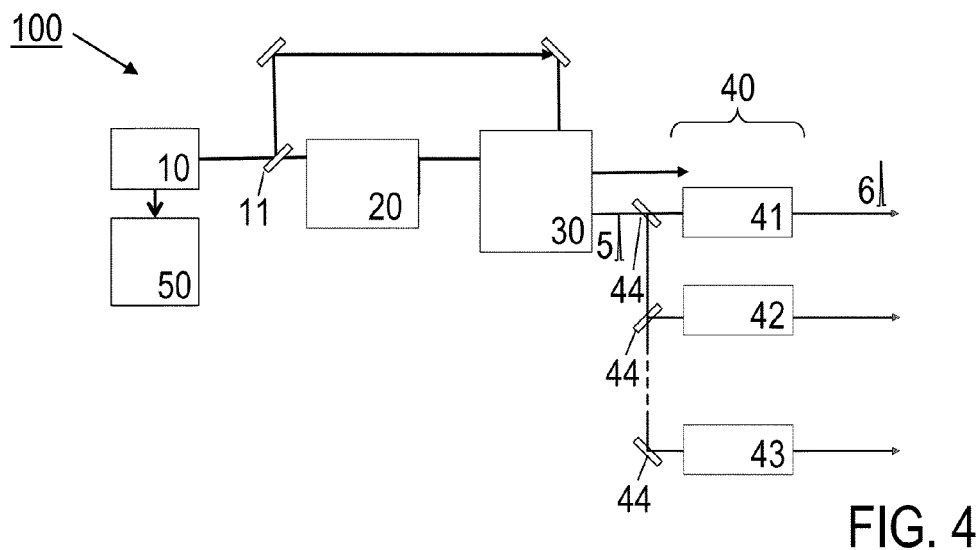
FIGS. 4 and 5: schematic representations of further embodiment of a pulse light source device according to the invention.

FIG. 4 illustrates a modified embodiment of the inventive pulse light source device 100 with the devices 10 to 50 as described above. Deviating from the embodiment of FIG. 3, the second broadening device 40 comprises not only one broadening unit, but multiple spectral broadening units 41, 42 and 43. The second fs driver pulses 5 (idler wave output of the OPA device 30) is split using e.g. semi-transparent mirrors 44 into different broadening channels each including one of the spectral broadening units 41, 42, 43. Each of the broadening channels receives an intensity portion of the second fs driver pulses 5. Advantageously, each of the spectral broadening units 41, 42, 43 includes a WLG crystal, which is optimized for spectral broadening in a different spectral range. Each spectral channel of the waveform synthesizer begins consequently with an adapted, optimized broadening stage, wherein the optimization concerns the spectral coverage, the shape and/or the phase of the fs output pulses 6. The fs output pulses can be provided by the output of each spectral broadening unit. Alternatively, the output of the spectral broadening units 41, 42, 43 can be re-combined for creating the fs output pulses to be obtained.

Figure 5:
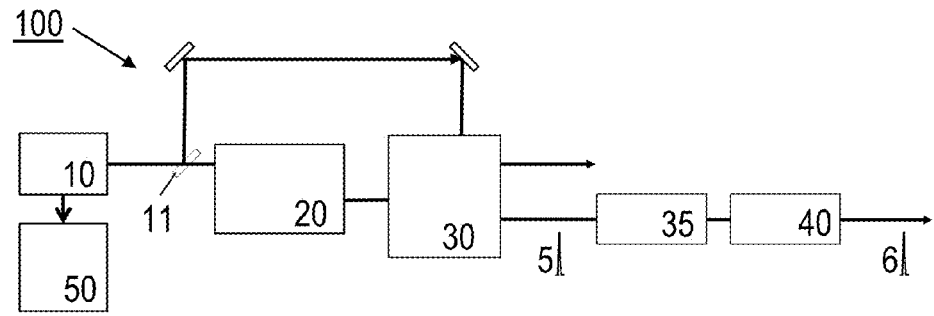

FIG. 5 illustrates a further modification of the pulse light source device 100, which comprises the devices 10 to as described above. Additionally, a SHG unit 35 is provided at the output of the OPA device 30. The second fs driver pulses 5 (idler wave of the last OPA or OPCPA unit in the OPA device 30) is subjected to a frequency doubling. Advantageously, this allows to reach further driver wavelengths with the second spectral broadening device 40. With further alternatives of the invention, the SHG unit 35 can be replaced by another optically non-linear crystal creating higher harmonics for further extending the wavelength range. Furthermore, at least one of the spectral channels of the second harmonic device 40 as shown in Figure may include a SHG unit 35 or another higher harmonics generation unit as shown in FIG. 5.

Figure 7:
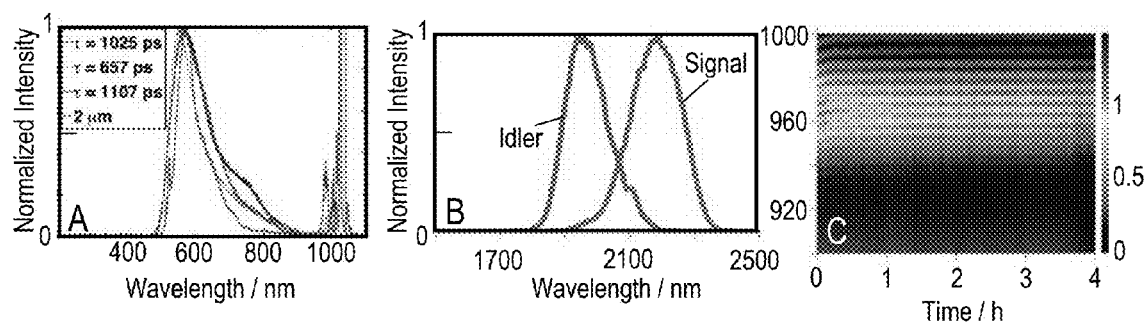
FIG. 7: a graphical representation of experimental results obtained with the invention.

FIG. 6 illustrates further details of the inventive pulse light source device 100, which can be realized e.g. with the embodiments of FIGS. 1 to 5. In particular, FIG. 6 illustrates the devices 10 to 40 in combination with a pulse diagnostic device 60, which is not a necessary feature of the invention, but used for characterizing the fs output pulses 6 (see FIG. 7).

The driver source device 10 includes a high-energy Yb:KYW regenerative amplifier 13, delivering 700 fs pulses after the first amplification stage, as described e.g. in [5]. Furthermore, the driver source device 10 comprises the driver compressor 14 delivering the first ps driver pulses 1. Additionally, the output of the driver compressor 14 is monitored with a power meter 15. The sensor signal of the power meter 15 can be used for implementing a feedback control for stabilizing the amplitude of the ps laser pulse output 1.

The first spectral broadening device 20 comprises a focusing lens L1, a WLG crystal X1, a curved mirror C1 and a flat mirror M2. The WLG crystal X1 is a YAG crystal with a length of 10 mm along the propagation direction of the light pulses. The WLG crystal X1 is pumped with the first ps driver pulses 2, so that first fs driver pulses 4 are generated with a spectral bandwidth centered at 2.18 μm.

The OPA device comprises first and second OPA stages 31, 32. Depending on the configuration of the pulse light source device 100, the first and second OPA stages 31, 32 are adapted for amplifying a part of the spectrum of the first fs driver pulses 4. The amplified part may have a bandwidth of e. g. 200 nm. With the curved mirror C1, the first fs driver pulses 4 are focused via the flat mirrors M2, M3 and the curved mirror C2 into the gain medium X2 of the first OPA stage 31. The gain crystal X2 is pumped with a first portion of the second ps driver pulses 3, obtained via a thin film polarizer TFP1 and a focusing lens L2. The gain crystal X2 comprises e.g. a BBO crystal.

The output of the gain crystal X2 of the first OPA stage 31 comprises pre-amplified fs pulses, which are focused via the flat mirror M4 and the curved mirror C3 into the gain crystal X3 of the second OPA stage 32. The gain crystal X3 is pumped with a second portion of the second ps driver pulses 3 obtained via a thin film polarizer TFP2 and a focusing lens L3. The idler wave of the gain crystal X3 (second fs driver pulses 5) is centered at 1.96 μm with a pulse duration of e. g. 50 fs.

The first and second OPA stages 31, 32 provide two amplification stages, but the first fs driver pulses 4 out of the first white-light stage 20 are not stretched. The pulse duration of the white-light first fs driver pulses 4 is estimated via the dispersion encountered during propagation through the material. In this case, the pulse duration is estimated to be less than 50 fs, while the duration of the pump pulses 2 is 700 fs: due to the non-matched pulse duration, i.e. overlap in time, the amplification is not maximized, but this avoids the difficulties of stretching and compressing the pulses. The difficulty arises with the wavelength chosen: 2 μm. Stretching and compressing can be done with material, but at this wavelength, the dispersion given by most of the materials is low and a long material is required. As already discussed above, the second OPA stage 32 reduces amplitude fluctuations originating from unsaturated gain in the first OPA stage 31. The reduced amplitude noise leads to less CEP fluctuations in the second white-light continuum generation process.

The second fs driver pulses 5 are focused via the flat mirror M5 and the focusing lens L4 into the WLG crystal X4 of the second broadening device 40. The WLG crystal X4 comprises e.g. a YAG crystal having a length of 3 mm along the propagation direction of the light pulses. The fs pulse output 6 of the WLG crystal X4 is focused via the curved mirror C4 into the diagnostic device 60, which is adapted for confirming the CEP stability of the fs pulse output 6. To this end, the diagnostic device 60 is an interferometry f-2f-set-up interfering the fundamental spectrum at 960 nm of the fs output pulses 6 with the second harmonic of the remaining fs output pulses 6. The second harmonic is generated in a SHG crystal X5. The superposition of both branches is monitored with a spectrometer 61.

The CEP-stable supercontinua fs output pulses 6 after the second spectral broadening device 40 obtained in the setup of FIG. 6 are shown in FIG. 7A. The pulse-to-pulse energy stability of the supercontinua reaches 3.4% and 2.8% for spectra below and above the driver wavelength, respectively. FIG. 7B shows signal and idler spectrum at the end of the second OPA stage 32 at 2.18 μm. The signal spectrum is centered at 2178 nm with a spectral bandwidth of 210 nm (FWHM), while the idler spectrum has 153-nm bandwidth at 1956 nm, corresponding to 26 fs transform limited pulses. The pulse amplitude fluctuations of the signal at the end of the second OPA is less than 2% (rms), which enables stable white-light continuum generation.

FIG. 7C shows the beating of the white-light in the range of 950-1000 nm with the second harmonic of the remaining idler after super-continuum generation. The spectrum of the beat signal is averaged over 1000 pulses. The fringes show clearly the CEP stability of the white-light continuum between 950 and 1000 nm. Over a 4 hours acquisition time, the phase slowly drifts less than 200 mrad, which can be easily stabilized with a slow feedback loop if required. The measured spectral interferences confirm that the CEP of the continuum is conserved for both short and long driver pulses.

The features of the invention disclosed in the above description, the drawings and the claims can be of importance individually or in combination or in sub-combination for the realization of the invention in its different embodiments.

The invention claimed is:
1. Pulse light source device, being configured for creating fs output pulses, comprising
   a driver source device including a ps laser pulse source, which is adapted for creating a ps laser pulse output,
   a first beam splitting device, which is arranged for splitting the ps laser pulse output to first ps driver pulses and second ps driver pulses, a first spectral broadening device, which is arranged for creating first fs driver pulses by spectrally broadening the first ps driver pulses, an optical parametric amplifier (OPA) device, which is arranged for creating carrier envelope phase (CEP) stabilized second fs driver pulses, wherein the OPA device is arranged for seeding on the basis of the first fs driver pulses and pumping with the second ps driver pulses, wherein the second fs driver pulses comprise idler pulses of the OPA device, and a second spectral broadening device, which is arranged for creating the fs output pulses, wherein the second spectral broadening device is arranged to be driven on the basis of the second fs driver pulses.

2. Pulse light source device according to claim 1, wherein the ps laser pulse source includes at least one of the following features the ps laser pulse source includes an Yb-doped solid state pulse laser, the ps laser pulse source includes a thin-disk laser, the ps laser pulse source includes a slab laser, the ps laser pulse source is arranged for creating the ps laser pulse output with a pulse duration of at least 300 fs and at most 5 ps, and the ps laser pulse source is arranged for creating the ps laser pulse output with a center wavelength in a range of 400 nm to 10 µm.

3. Pulse light source device according to claim 1, wherein the first spectral broadening device includes at least one of the following features the first spectral broadening device includes a white light generation crystal, the first spectral broadening device includes an optical fiber, and the first spectral broadening device is arranged for creating the first fs driver pulses with a pulse duration of at least 20 fs and at most 300 fs.

4. Pulse light source device according to claim 1, wherein the OPA device comprises a first OPA stage, which is arranged for creating pre-amplified fs pulses, the first OPA stage being arranged for seeding with the first fs driver pulses and pumping with the second ps driver pulses, and a second OPA stage, which is arranged for creating the second fs driver pulses, the second OPA stage being arranged for seeding with the pre-amplified fs pulses and pumping with the second ps driver pulses.

5. Pulse light source device according to claim 1, wherein the OPA device comprises a pulse stretcher unit, which is arranged for stretching the first fs driver pulses, an OPA stage, which is arranged for creating amplified stretched pulses, the OPA stage being arranged for seeding with the stretched first fs driver pulses and pumping with the second ps driver pulses, and a pulse compressor unit, which is arranged for creating the second fs driver pulses by compressing the amplified stretched pulses output by the OPA stage.

6. Pulse light source device according to claim 1, wherein the second spectral broadening device includes at least one of the following features the second spectral broadening device includes a white light generation crystal, the second spectral broadening device includes an optical fiber, the second spectral broadening device is arranged for creating the fs output pulses with a pulse duration of at least 1 fs and at most 500 fs, the second spectral broadening device is arranged for creating the fs output pulses covering a frequency range of at least two octaves, and the second spectral broadening device is arranged for creating the fs output pulses with a center wavelength in a range of 0.4 µm to 10 µm.

7. Pulse light source device according to claim 1, further comprising a second beam splitting device, which is arranged for splitting the second fs driver pulses to at least two portions of second fs driver pulses, and the second spectral broadening device includes at least two spectral broadening units, each of which being arranged for spectrally broadening one of the at least two portions of second fs driver pulses, respectively, wherein each of the spectral broadening units is arranged for creating fs output pulses with at least one of specific spectral coverage, pulse shape and phase.

8. Pulse light source device according to claim 1, wherein the output of the driver source device is directly coupled with the first spectral broadening device.

9. Pulse light source device according to claim 1, wherein an idler output of the OPA device is directly coupled with the second spectral broadening device.

10. Pulse light source device according to claim 1, wherein an idler output of the OPA device is coupled via a second harmonic generation unit with the second spectral broadening device.

11. Method of creating fs output pulses, comprising creating a ps laser pulse output with a ps laser pulse source, splitting the ps laser pulse output to first ps driver pulses and second ps driver pulses, creating first fs driver pulses by spectrally broadening the first ps driver pulses with a first spectral broadening device, creating carrier envelope phase (CEP) stabilized second fs driver pulses by seeding an optical parametric amplifier (OPA) device on the basis of the first fs driver pulses and pumping the OPA device with the second ps driver pulses, wherein the second fs driver pulses comprise idler pulses of the OPA device, and creating the fs output pulses by driving a second spectral broadening device on the basis of the second fs driver pulses.

12. Method according to claim 11, wherein the step of creating the ps laser pulse output includes at least one of the following features the ps laser pulse output is created with an Yb-doped solid state pulse laser, the ps laser pulse output is created with a thin-disk laser, the ps laser pulse output is created with a slab laser, the ps laser pulse output is created with a pulse duration of at least 300 fs and at most 5 ps, and the ps laser pulse output is created with a center wavelength in a range of 400 nm to 10 µm.

13. Method according to claim 11, wherein the step of creating the first fs driver pulses includes at least one of the following features the first fs driver pulses are created with a white light generation crystal, the first fs driver pulses are created with an optical fiber, and the first fs driver pulses are created with a pulse duration of at least 20 fs and at most 300 fs.

14. Method according to claim 11, wherein the step of creating the second fs driver pulses comprises
- creating pre-amplified fs pulses with a first OPA stage, which is seeded with the first fs driver pulses and pumped with a first portion of the second ps driver pulses, and
- creating the second fs driver pulses with a second OPA stage, which is seeded with the pre-amplified fs pulses and pumped with a second portion of the second ps driver pulses.

15. Method according to claim 11, wherein the step of creating the second fs driver pulses comprises
- stretching the first fs driver pulses,
- creating amplified stretched pulses with an OPA stage, which is seeded with the stretched first fs driver pulses and pumped with the second ps driver pulses, and
- creating the second fs driver pulses by compressing the amplified stretched pulses output by the OPA stage.

16. Method according to claim 11, wherein the step of creating the fs output pulses includes at least one of the following features
- the fs output pulses are created with a white light generation crystal,
- the fs output pulses are created with an optical fiber,
- the fs output pulses are created with a pulse duration of at least 1 fs and at most 500 fs,
- the fs output pulses are created in a frequency range of at least two octaves, and
- the fs output pulses are created with a center wavelength in a range of 0.4 µm to 10 µm.

17. Method according to claim 11, comprising the further step of
- splitting the second fs driver pulses to at least two portions of second fs driver pulses, and
- spectrally broadening each of the at least two portions of second fs driver pulses with a spectral broadening unit, wherein
- each spectral broadening unit creates fs output pulses with at least one of specific spectral coverage, pulse shape and phase.

18. Method according to claim 11, wherein
an output of a driver source device is directly coupled with the first spectral broadening device.

19. Method according to claim 11, wherein
an idler output of the OPA device is directly coupled with the second spectral broadening device.

20. Method according to claim 11, wherein
an idler output of the OPA device is coupled via a second harmonic generation unit with the second spectral broadening device.

* * * * *